United States Patent [19]

Seng

[11] Patent Number: 4,701,220

[45] Date of Patent: Oct. 20, 1987

[54] ONE-COMPONENT FORMULATION FOR PRECIPITATING, DETACKIFYING AND COAGULATING UNDERSEAL

[75] Inventor: Hans-Peter Seng, Süssen, Fed. Rep. of Germany

[73] Assignee: Zeller+Gmelin GmbH & Co., Eislingen, Fed. Rep. of Germany

[21] Appl. No.: 742,513

[22] Filed: Jun. 7, 1985

[51] Int. Cl.$^4$ ............................ C08L 1/00; C08L 5/00
[52] U.S. Cl. .................................. 106/203; 106/119; 106/120; 106/163.1; 106/204
[58] Field of Search ..................... 106/119, 120, 163.1, 106/203, 204; 210/712, 728

[56] References Cited

U.S. PATENT DOCUMENTS

| | | | |
|---|---|---|---|
| 1,792,254 | 2/1931 | Smyser | 106/119 |
| 2,354,146 | 7/1944 | Samuel | 210/728 |
| 2,928,498 | 3/1960 | Nisoli | 536/97 |
| 3,227,570 | 1/1966 | Bishop | 106/120 |
| 4,220,456 | 9/1980 | Block | 55/85 |
| 4,504,395 | 3/1985 | Harpel | 134/38 |

FOREIGN PATENT DOCUMENTS 0104904  4/1984  European Pat. Off. .
3047527 12/1982  Fed. Rep. of Germany .
3405451  8/1984  Fed. Rep. of Germany .

OTHER PUBLICATIONS

*Hackh's Chemical Dictionary*, p. 389, 1969, Grant, Julius.

Chihara et al., "Sludge Separation from Painting Booth Scrubbing Wastewater", Chemical Abstracts, vol. 91, 62198, (1979).

*Primary Examiner*—Theodore Morris
*Attorney, Agent, or Firm*—Burns, Doane, Swecker & Mathis

[57] ABSTRACT

The invention relates to a one-component formulation, containing an additive which envelops paint particles, for precipitating, detackifying and coagulating underseal based on waxes, wax-like plastics and plastics dispersions and also synthetic resin paints in wet paint mist separators of paint-spraying installations, a sedimenting paint sludge being obtained, which formulation comprises, as the additive, an aqueous suspension of hydrated marble lime.

The invention also relates to the use of the above one-component formulation for precipitating, detackifying and coagulating underseal based on waxes, wax-like plastics and plastics dispersions and also synthetic resin paints in wet separators of paint-spraying installations, a sedimemting paint sludge being obtained.

3 Claims, No Drawings

ONE-COMPONENT FORMULATION FOR PRECIPITATING, DETACKIFYING AND COAGULATING UNDERSEAL

FIELD OF THE INVENTION

One-component formulation for precipitating, detackifying and coagulating underseal based on waxes, wax-like plastics and plastics dispersions and also synthetic resin paints in wet separators of paint-spraying installations, a sedimenting paint sludge being obtained, and the use thereof.

In paint-spraying installations, paint is sprayed under pressure through nozzles in fine dispersion onto objects, for example automobiles, which are to be painted. This is carried out in so-called spraying booths, spraying stations or on spraying walls. The paint mist thus formed must be removed again from the air. For this purpose, air contaminated with paint mists is drawn by means of fans through wet paint mist separators, in which water is passed through in counter-current and brought into intimate contact with the air containing paint mists by means of inserts and the like. A wet paint mist separator of this type has been disclosed by German Auslegeschrift No. 1,269,594.

For precipitating and coagulating the paint particles deposited in the water which is continuously circulated in the wet separator, agents having an alkaline reaction, so-called paint detackifying or coagulating agents, are usually added to the water. This reduces the tendency of the paint particles to deposit on the walls of the wet separator and other structural elements, so that malfunctions and a considerable maintenance and cleaning effort are avoided. The transporting-away and the final storage of the paint sludge are also facilitated when it consists of a non-tacky paint coagulate.

A procedure of this type is described in German Offenlegungsschrift No. 2,758,873, which relates to a process for precipitating synthetic resin paints in wet paint mist separators of paint-spraying installations, using water adjusted to an alkaline reaction and containing an additive which envelops paint particles, which process comprises the use of an aqueous wax dispersion as the additive. In this case, the water is to be adjusted to a pH value of 8.0 to 13.5, concentrated aqueous caustic soda being used for this purpose. The wax dispersion used as the additive contains with advantage a mixture of montan wax and paraffin derivatives. This is a two-component formulation, since alkali is added separately, in addition to the wax dispersion.

Moreover, as practice has shown, this process requires working in the presence of surfactants, even though the use of surfactants is described therein only as being advantageous.

The function of further conventional coagulating agents is based on:
1. caustic soda and mineral oil,
2. caustic soda only,
3. acid, neutral or alkaline flocculating agents based on aluminum and iron salts, with the addition of polymeric acrylates as flocculating aids,
4. mixtures of sodium hydroxide, silicates and phosphates in powder form,
5. calcium chloride solutions and
6. wax dispersions and caustic soda.

All these coagulating agents are more or less capable of coagulating paints based on nitro, polyacrylate, polyester, polyurethane and wax underseal of conventional type in the form of a sedimenting coagulate. However, all the conventional coagulating agents hitherto known, including those based on wax, are not capable of coagulating and detackifying underseal and anti-chipping coating types based on novel combinations of natural waxes or wax-like ingredients, to give a sediment.

It was therefore the object of the invention to provide a one-component formulation which is suitable for precipitating, detackifying and coagulating underseal based on waxes, wax-like plastics and plastics dispersions and also synthetic resin paints in wet paint mist separators of paint-spraying installations, a sedimenting paint sludge being formed, which is satisfactory largely without further additions to the coagulating liquor, in particular without the addition of an antifoam.

These objects are achieved by the use of an aqueous suspension of hydrated marble lime as the additive.

The subject of the invention is a one-component formulation containing an additive which envelops paint particles for precipitating and detackifying and coagulating underseal based on waxes, wax-like plastics and plastics dispersions and also synthetic resin paints in wet paint mist separators of paint-spraying installations, a sedimenting paint sludge being obtained, which formulation comprises, as the additive, an aqueous suspension of hydrated marble lime.

If the underseal is based on plastics dispersions, this plastic is, for example, PVC.

According to an embodiment of the invention, the suspension of hydrated marble lime contains a mixture of a blend containing cellulose and montmorillonite or smectite, and of sodium salts of naphthalenesulfonic acid condensation products. This mixture enables a stable, pumpable and stirrable, high-percentage suspension of hydrated marble lime to be prepared. The blend of cellulose and montmorillonite or smectite is a combination of a swellable organic material with a swellable inorganic material. Preferably, this blend consists of 50-70% by weight of cellulose and 30-50% by weight of montmorillonite or smectite.

According to a further embodiment, low-foaming, alkali-resistant, surface-active wetting agents based on fatty alcohol alkoxylate are added to the suspension of hydrated marble lime.

A specific one-component formulation of the type defined in accordance with the invention comprises:
(a) 0.1–0.5%, preferably 0.4–0.5%, of a blend containing cellulose and montmorillonite or smectite,
(b) about 1–2%, preferably 1.5%, of an aliphatic alcohol having 1–3 carbon atoms,
(c) 1–10%, preferably 4–6%, of a fatty alcohol alkoxylate,
(d) 0.1–0.8%, preferably 0.4–0.6%, of a naphthalenesulfonic acid condensation product, and
(e) 30–50%, preferably 38–41%, of hydrated marble lime, each relative to the weight of the formulation, the remainder of the formulation being represented by water.

A preferred one-component formulation according to the invention has the following composition:

| | |
|---|---|
| Water | 52.5% by weight |
| Blend of 50–70% by weight of cellulose and 30–50% by weight of montmorillonite or smectite | 0.5% by weight |
| Propan-2-ol | 1.5% by weight |
| Fatty alcohol alkoxylate as an alkali-resistant, low-foaming | 5.0% by weight |

-continued

| | |
|---|---|
| surfactant | |
| Sodium salt of a naphthalenesulfonic acid condensation product | 0.5% by weight |
| Hydrated white marble lime | 40.0% by weight. |

This specific one-component formulation has the following characteristic data:

| | |
|---|---|
| Viscosity/20° C.: | about 300 seconds flow time in a 4 mm Ford cup |
| Color | milky white |
| Density/20° C. | 1.29 g/ml |
| pH value in the use concentration | 12.2 |

Component (a) of the formulation according to the invention is an organically modified magnesium layer silicate. The pH value of a 2% aqueous suspension of component (a) is 8.8 to 10.2.

The aliphatic alcohols, having 1 to 3 carbon atoms, of components (b) can in particular be ethanol and propan-2-ol, and also methanol, even though the last-mentioned is less preferred on account of its toxicity. Preferably, propan-2-ol is used.

Component (c) is a fatty alcohol alkoxylate which is obtained by reacting a ($C_8$–$C_{12}$)-fatty alcohol with ethylene oxide and propylene oxide. A preferred fatty alcohol alkoxylate of this type has the following characteristic data:

| | |
|---|---|
| Cloud point (DIN 53,917, 5 g + 25 g of 25% BDG solution) | about 41° C. |
| pH value (5% in water) | about 7 |
| Density (20° C.) | about 0.94 g/cm |
| Setting point | about −20° C. |
| Surface tension (DIN 53,914, 1 g/l, 20° C.) | about 33 mN/m |

Component (d) represents a naphthalenesulfonic acid condensation product which preferably has the following characteristic data:

| | |
|---|---|
| Sodium sulfate content | 5–7% |
| pH value (10% in water) | 6.5–7.5 |

This special case thus represents a product which has been fully converted into the salt.

Regarding component (e) (hydrate marble lime), this has already been used as an additive in effluent treatment, predominantly in municipal treatment plants, in the form of so-called milk of lime. These are highly diluted, aqueous suspensions of calcium hydroxide. By contrast, the formulation according to the invention is distinguished by the fact that, due to the use of a blend containing cellulose and montmorillonite or smectite together with the naphthalenesulfonic acid condensation products, a high-percentage, still flowable and pumpable suspension of hydrated marble lime in water is obtained, which remains stable as such without stirring.

The hydrated white marble lime or hydrated white lime, used here as the actual active ingredient, has the following chemical composition:

| | |
|---|---|
| Loss on ignition | 24.79% |
| of which water of hydration | 22.7% |
| carbon dioxide | 1.71% |
| silicic acid | 0.75% |
| iron oxide of the chemical formula $Fe_2O_3$ | 0.15% |
| aluminum oxide of the chemical formula $Al_2O_3$ | 0.41% |
| calcium oxide | 72.86% |
| magnesium oxide | 0.41% |
| sulfate sulfur of the chemical formula $SO_3$ | 0.19% |
| Remainder not known | 0.44% |
| Total | 100.00% |

The components contained in the formulation according to the invention have the following modes of action.

The naphthalenesulfonic acid condensation products act as stabilizers and dispersing aids with a protective colloid action. The use of these products enables highly concentrated but flowable and pumpable suspensions of hydrated white marble lime to be prepared.

The blend of cellulose, montmorillonite or smectite ensures, by forming a skeleton, that the particles of hydrated white marble lime are kept in suspension; sedimentation phenomena are thus prevented.

If the two components were only used each individually, either the viscosity of the suspension becomes excessive or the hydrated marble lime sediments very fast. A stable but still pumpable suspension is obtained only by the use of both components.

The hydrated marble lime and the fatty alcohol alkoxylate are responsible for the coagulating action. The other components serve only for standardizing the suspension.

In detail, the hydrated marble lime has the following modes of action:
1. It detackifies the underseal, based on natural waxes, which cannot be detackified with conventional coagulating agents.
2. It converts the underseal into a coagulate which sinks in water and which can be continuously discharged by means of a bottom scraper. This ensures functioning of the painting installation and disposal of the overspray material.
3. It combines 3 properties in one component, namely those
3.1 of an alkaline detackifier,
3.2 of a paint adsorbent and
3.3 of a flocculating agent for paint/lime agglomerates.

The hydrated marble lime is added, not as a solid powder, but in the form of a stable, pumpable, highpercentage suspension, without corresponding pretreatment dirctly into the painting installation. By contrast, known coagulating agents, currently on the market, in powder form do not form stable aqueous suspensions and, when standing for increasing lengths of time, lose the coagulating effect, so that only about one daily requirement can each time be made up into a suspension.

Due to the use of a low-foaming, pH-resistant surfactant based on a fatty alcohol alkoxylate, contact of the hydrophilic hydrated lime with the hydrophobic underseal is produced rapidly and intensively. This results in a detackified coagulate.

The formulation according to the invention can be prepared as follows:

The water is introduced first. A preproduct consisting of the aliphatic alcohol and the blend of cellulose, montmorillonite or smectite is stirred in by means of a stirring implement (for example a slowly rotating anchor stirrer). The naphthalenesulfonic acid condensation products and the fatty alcohol alkoxylate are then stirred in. Finally, the hydrate marble lime is introduced with slow stirring.

The formulation according to the invention is suitable as an additive in paint-spraying booths and paint-spraying stations with a wash-out system for a coagulate which sinks. It detackifies paints and underseal types completely, so that work free from interruptions is ensured in the installations. The cleaning effort is minimized and the life of the coagulation liquor is considerably extended. In particular, the formulation according to the invention is suitable for use on solvent-based paints and underseal types.

In use, the formulation according to the invention can be fed to the circulating water, with the pump running, manually or by means of a metering pump. It acts independently of the pH value and the water hardness of the wash-out bath.

The particular addition rate depends on the paint type and quantity or underseal type and quantity which is to be detackified. The type of installation and the mode of operation also play an important role. The optimum addition rate is therefore determined for each particular use in practice. The following base data may here be assumed:

| Base addition: | 1-2%, relative to the water volume, of the formulation according to the invention |
|---|---|

When the formulation according to the invention is to be used for the first time, a wash-out bath already being operated can be replenished with this formulation, without addition of fresh water.

| Further addition: | 1 l of formulation according to the invention per 10-20 kg of overspray quantity. |
|---|---|

The formulation according to the invention represents the only coagulating agent so far which can detackify the special Tectyl DB 100 underseal and convert it into a sedimenting coagulate. (This is a widely used underseal for trucks). The sedimenting paint sludge thus formed can be cleared out without any problems via a bottom scraper.

A further subject of the invention is therefore the use of the present one-component formulation for precipitating, detackifying and coagulating synthetic resin paints and underseal formulations in wet separators of paint-spraying installations, a sedimenting paint sludge being obtained.

The example which follows explains the invention.

EXAMPLE

A one-component formulation of the following composition is prepared:

| | |
|---|---|
| Water | 52.5% by weight |
| Blend of 50-70% by weight of cellulose and 30-50% by weight of montmorillonite or smectite | 0.5% by weight |
| Propan-2-ol | 1.5% by weight |
| Fatty alcohol alkoxylate | 5.0% by weight |
| Sodium salt of naphthalenesulfonic acid condensation products | 0.5% by weight |
| Hydrated white marble lime | 40.0% by weight |

For this purpose, a preproduct of propan-2-ol and the blend of cellulose and montmorillonite or smectite are stirred by means of a stirrer implement into the water introduced first. The naphthalenesulfonic acid condensation products and the fatty alcohol alkoxylate are then stirred in. Finally, the hydrated marble lime is introduced, being slowly stirred in.

The resulting paste has a flow time of about 300 seconds in a Ford cup with a 4 mm nozzle. The density of the product is 1.29 and its pH value is about 14.

Using this formulation, a wax-based underseal with about 35% solvent content (trade name Tectyl DB 100) and a wax-based cavity sealer are coagulated.

| Base addition: | 1,000 kg of one-component formulation in 80 m³ of water, corresponding to 1.25%, relative to the water volume of the painting installation. |
|---|---|
| Further addition: | 120 kg of one-component formulation after about 20 days. |

During the said 20 days, about 6,000 kg of underseal have arisen as overspray. Thus, 1 kg of one-component formulation is added per 50 kg of overspray.

The further addition rate settles out at 1 kg of one-component formulation per 20 kg of overspray.

The detackified coagulate having a tendency to sediment can be cleared out without any problems by means of a bottom scraper.

What is claimed is:

1. The one-component formulation for precipitating, detackifying and coagulating underseal based on wax, wax-like plastic and plastic dispersions, and synthetic resin paint in an aqueous mixture to obtain a sedimenting paint sludge comprising an additive which envelops paint particles, said additive being an aqueous suspension of hydrated marble lime, wherein the suspension of hydrated marble lime contains a mixture of a blend containing cellulose and montmorillonite, smectite or combination thereof, and the condensation product of sodium salts of naphthalenesulfonic acid.

2. The one-component formulation for precipitating, detackifying and coagulating underseal based on wax, wax-like plastic and plastic dispersions, and synthetic resin paint in an aqueous mixture to obtain a sedimenting paint sludge comprising an additive which envelops paint particles, said additive being an aqueous suspension of hydrated marble lime, wherein the aqueous suspension of hydrated marble lime further contains a low-foaming, alkali-resistant, surface-action wetting agent based on fatty alcohol alkoxylate.

3. A one-component formulation which comprises
   (a) 0.1-0.5% of a blend containig cellulose and montmorillonite or smectite,
   (b) about 1-2% of an aliphatic alcohol having 1-3 carbon atoms,
   (c) 1-10% of a fatty alcohol alkoxylate,
   (d) 0.1-0.8% of a naphthalenesulfonic acid condensation product and
   (e) 30-50% of hydrated marble lime, each relative to the weight of the formulation, the remainder of the formulation being represented by water.

* * * * *